United States Patent

Brown et al.

[11] 4,084,500
[45] Apr. 18, 1978

[54] SYNTHETIC RESIN CURED IN PLACE ROTARY EMBOSSING COUNTER ROLLER

[75] Inventors: William E. Brown; Ramon J. Magee, both of Independence; Dennis R. McCoy, Gladstone, all of Mo.

[73] Assignee: Hallmark Cards, Incorporated, Kansas City, Mo.

[21] Appl. No.: 758,677

[22] Filed: Jan. 12, 1977

Related U.S. Application Data

[63] Continuation-in-part of Ser. No. 656,361, Feb. 9, 1976, abandoned.

[51] Int. Cl.² ............................................. B44B 5/02
[52] U.S. Cl. ....................................... 101/28; 29/132; 101/401.1; 428/36; 428/222
[58] Field of Search ................ 428/908, 909, 36, 222; 101/401.1, 401.3, 28; 29/121.1, 132

[56] References Cited

U.S. PATENT DOCUMENTS

| | | | |
|---|---|---|---|
| 3,294,889 | 12/1966 | Downie et al. | 101/401.1 |
| 3,560,289 | 2/1971 | Otto et al. | 156/219 |
| 3,575,109 | 4/1971 | Wall | 101/401.1 |
| 3,652,376 | 3/1972 | Bowden | 428/909 |

Primary Examiner—William R. Dixon, Jr.
Attorney, Agent, or Firm—Schmidt, Johnson, Hovey & Williams

[57] ABSTRACT

A resurfaceable rotary die counter is prepared by employing a cylindrical counter core having a central, circumferentially extending relieved area filled with readily replaceable synthetic resin material containing pre-tensioned, spirally wound glass fiber roving which renders the resin craze and crack resistance even under extended continuous use. Economical counter production is possible because of preparation of the counter on the press during makeready using the die as a counter forming element. The resin is run in against the die prior to hardening of the same to form a reverse design surface in the counter which exactly mates with the die surfaces. A viscous resin having a minimum viscosity of about 6000 cps. is employed which has the characteristics of remaining on the counter core without substantial flow until ultraviolet cure can be effected. Fiber glass roving spirally wound under tension around the resin backed core during application of successive resin layers thereto provides a ten fold increase in strength over previously available systems.

8 Claims, 14 Drawing Figures

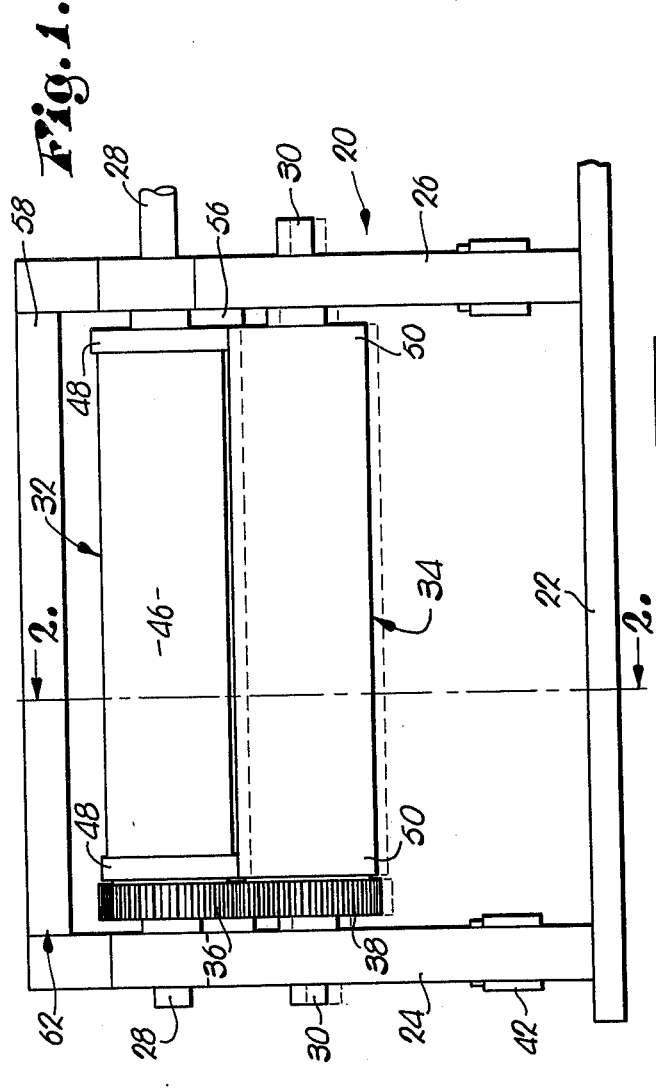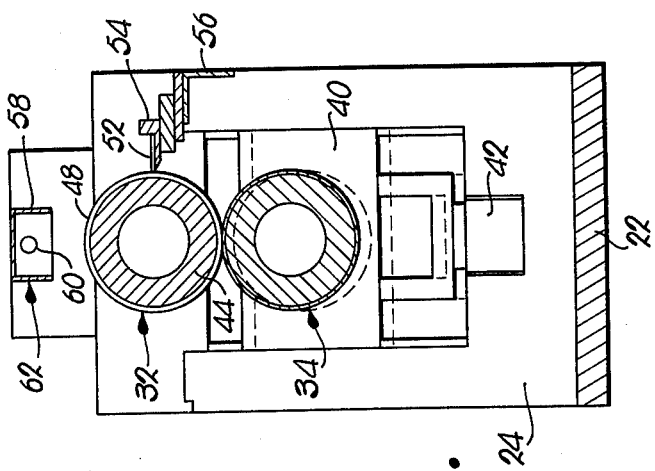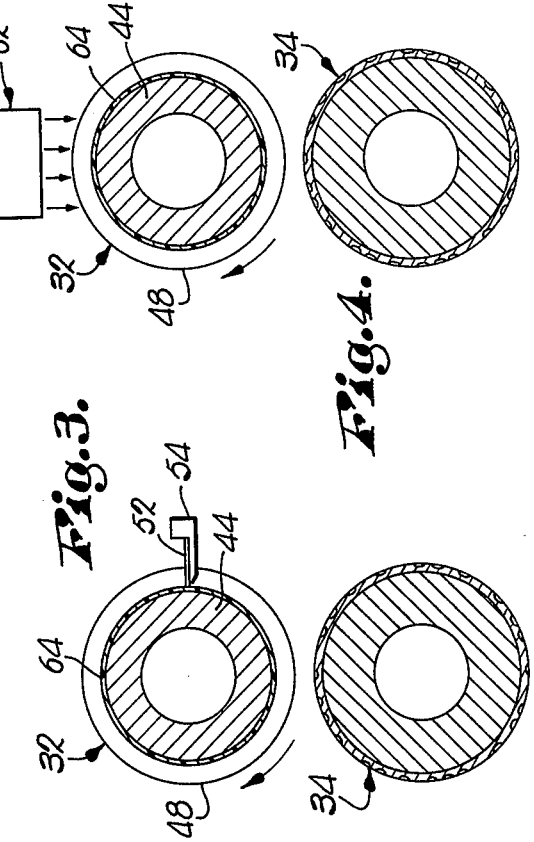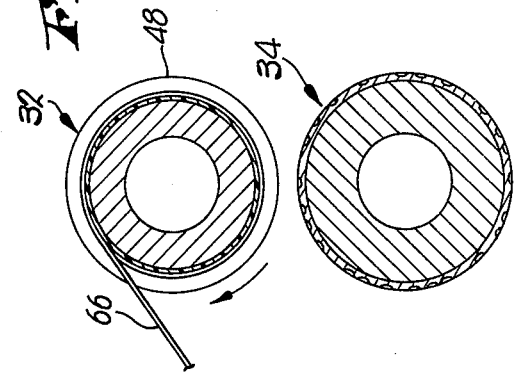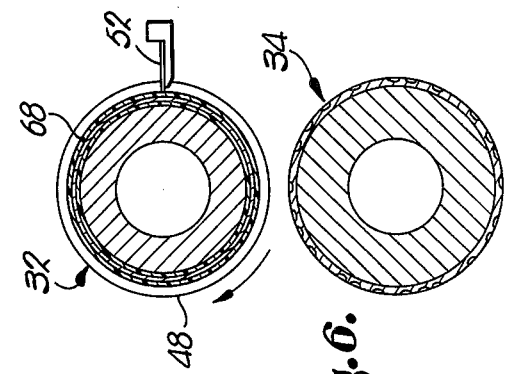

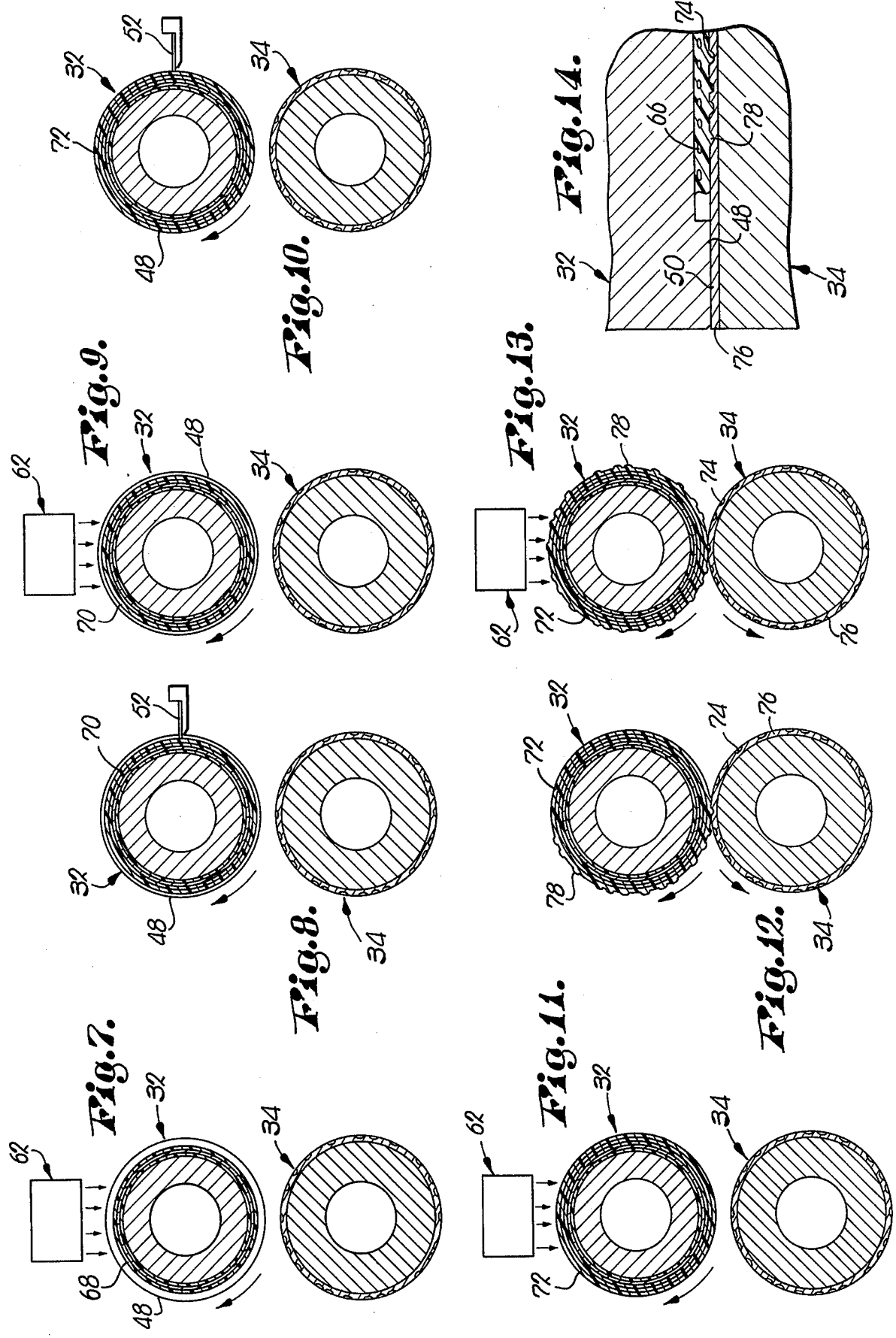

SYNTHETIC RESIN CURED IN PLACE ROTARY EMBOSSING COUNTER ROLLER

This Application is a continuation-in-part of identically titled application Ser. No. 656,361, filed Feb. 9, 1976 now abandoned.

This invention relates to rotary counters adapted for use against cylindrical embossing dies having modeled surfaces presenting a design therein, and especially to improved manufacturing processes, equipment and products which have inherent advantages over the production methods and counters disclosed in U.S. Pat. No. 3,560,289 entitled "Rotary Embossing Die Counter" and owned by the assignee hereof.

As explained in the U.S. Pat. No. 3,560,289, a number of different techniques have heretofore been employed in the graphic arts field to prepare rotary counters which are run against embossing or foil stamping dies having either raised or depressed areas in the surface thereof to present artistic designs. Typical products which have been embossed or foil stamped with a rotary die and counter set include greeting cards, calendars, party accessories, napkins, wrapping paper, appliques for various paper and metal items, and decorative sheet articles. Rotary systems for impressing paper, metal and plastic sheet materials have the advantage of being operable on a continuous basis and are especially effective for long runs with a repeating design.

By virtue of the modeled, normally intaglio relief in the surface of the rotary die defining the design therein, a counter rotatable against the die having a modeled face which conforms to and is a reverse of the irregular surface of the die is required to assure uniform embossing or foil stamping of the sheet material passed between the rolls. The process of U.S. Pat. No. 3,560,289 represents one procedure for preparing a rotary counter in a more economical manner than theretofore available. In the production procedure of the patent, several layers of an ultraviolet sensitive, thermosetting, partially cured synthetic resin blanket reinforced with glass cloth (known as "pre-preg") is applied to a counter roll. After further curing of the resin to reduce the tackiness thereof, the die is rotated against the resin blanket on the counter roll to cause the outer face of the blanket to conform to the die surface as a reverse thereof.

Final cure of the resin on the counter roll is effected by application of ultraviolet energy to the resin during rotation of the counter roll. This procedure was offered as a replacement for the conventional practice of running the die against a pressure deformable counter roll made up of cloth, paper or similar material until the surface of the counter substantially assumed a relatively permanent set conforming to a reverse of the die. Not only was considerable operator skill required with such prior methods to determine exactly when the counter had been shaped sufficiently for effective use thereof, but operation of the process was inherently expensive because of the time consumed in preparing a useful counter coupled with the need to replace the cotton or felt pads at relatively frequent intervals to maintain proper quality of the impressed design of the sheet material being processed.

Although the counter makeready procedures of the U.S. Pat. No. 3,560,289 represented a distinct improvement over previously available counter preparation methods, competitive cost factors and spiraling labor costs dictated a search for even more economical counter manufacturing methods and procedures which would result in a counter having a significantly longer useful life than that of the previously patented process.

Accordingly, it is an important object of the present invention to provide a resurfaceable rotary counter for use against a cylindrical embossing die and which has greater inherent strength than previous synthetic resin prepared in place counters without destruction of the required inherent resiliency thereof necessary to preclude cracking and crazing of the counter surface caused by excessive brittleness.

A further important object of the invention is to provide a method of preparing a rotary counter for a cylindrical embossing die which is recyclable in that the counter defining surface of the roll may be readily removed and replaced thus producing considerable cost savings by virtue of the fact that the counter core may be used over and over when wear dictates preparation of a new counter surface, or the need to run a new design.

A still further important object of the invention is to provide an improved process for preparing rotary die counters wherein a steel counter core is provided with a relatively shallow, circumferentially extending relieved area therein adapted to be filled with a synthetic resin material containing pretensioned, spiral wound glass fiber roving with the resin system being curable in place so that after aplication of the resin to the roll and partial curing thereof, the resin may be run in against the die and then finally hardened in operative position on the press to the end that a minimum of down-time is experienced while at the same time allowing repair of the counter on the press as may be necessary during the production run.

Another important object of the invention is to provide a prepared-in-place rotary counter wherein the end cylindrical segments of the counter roll on opposite extremities of the resin receiving relieved area in the face thereof serve as bearer surfaces engagable with complementary surfaces of the die to provide extremely close tolerances for the resin part of the counter to assure impressed designs of required clarity, precision and uniformity.

A still further important object of the invention is to provide an improved process for preparing rotary die counters in a more economical manner than heretofore possible by virtue of the fact that the resin applied to the relieved area of the counter core has not been partially pre-cured but has sufficient viscosity to substantially retain its shape without significant deformation until curing of the resin can be effected with means such as an ultraviolet light source. This allows the fabricator to quickly and readily apply resin to the core and effect cure thereof in a very short period of time while mounted in operative position on the press. These production steps especially lend themselves to preparation of a counter surface made up of a number of successively applied layers which bond one to another and which are effectively strengthened by pre-tensioned reinforcement comprising wound glass fiber roving incorporated into an inner layer of resin during fabrication of the counter. By virtue of the restraint placed on the continuous glass fiber strands during winding of the same about an inner resin layer on the cylinder, the roving is placed under a certain degree of tension so that the next coating of the resin material applied to the cylinder and at least partially cured incorporates the reinforcing glass into the cylindrical interior of the resin counter to ultimately produce a much stronger than anticipated counter surface without attendant cracking or deterioration problems.

Also an important object of the invention is to use initially uncured viscous resin systems for the counter which may be applied in layers and only partially cured with a UV source during buildup of the counter surface so that final cure to bond all layers into a hardened, essentially monolithic mass may be accomplished after impression of the image layer thus allowing selective partial and then final cure as well as glass fiber reinforcement of the resin in place on the counter core.

Counters prepared in accordance with present invention are especially adapted for use against an embossing die usable to impress an overall embossing pattern in a sheet of web-fed material. The die itself is normally of metal and prepared in accordance with standard techniques such as electrodeposition methods, formation of thermosetting, initially planar blanks which are pierced and blanked at opoosite ends thereof so that the mats may be attached to a suitable supporting cylinder therefore, or machined to present an intaglio model design in any type of suitable material including steel, brass, thermosetting synthetic resin, nickel or copper. For purposes of describing the present rotary counters and the procedures of constructing the same, it is assumed that the embossing die cylinder is of the type described and prepared in accordance with the conventional methods outlined.

In the drawings:

FIG. 1 is an essentially schematic front elevational view of one type of press on which the rotary die counters of this invention may be prepared and used illustrating the normal operative disposition of the counter with respect to the embossing die, along with a removable source of ultraviolet light for curing the resin in place on the counter core;

FIG. 2 is a cross-sectional view taken substantially on line 2—2 of FIG. 1 and looking in the direction of the arrow;

FIG. 3 is a schematic showing of the counter core having a layer of resin thereon being leveled with a doctor blade during rotation of the counter and illustrating the normal position of the counter core with respect to the die;

FIG. 4 is a schematic showing similar to FIG. 3 and illustrating the way in which the resin may be cured in place upon activation of the ultraviolet light source;

FIG. 5 illustrates schematically the way in which tensioned glass roving made up of continuous glass fibers is spirally wound around the resin coated counter core to reinforce the counter material;

FIG. 6 illustrates schematically another step in the process wherein a layer of resin is applied to the counter and doctored to desired height by the shiftable doctor blade;

FIG. 7 is a schematic representation of the following step in the process wherein the layer of resin over the roving is cured in place through use of the ultraviolet source located above the counter;

FIGS. 8, 9, 10 and 11 shows in schematic form how successive layers of resin are applied to the counter core and cured in place;

FIGS. 12 and 13 schematically illustrate the way in which the die is run against the partially cured outer resin layer on the counter core to produce a modeled surface in the resin which is a reverse duplicate of the die face whereupon the counter is subjected to a final ultraviolet cure; and FIG. 14 is an enlarged fragmentary schematic cross-sectional view of the counter and die showing the way in which the resin fills a relieved area in the counter core and has in the instance illustrated, raised areas which complementally extend into the intaglio design of the die.

The embossing press 20 shown schematically in FIGS. 1 and 2 is preferably of the type which allows at least one of the cylinders thereof to be shifted relative to the other without loss of registration therebetween with the cylinders being operably interconnected by gearing to avoid slippage therebetween during rotation. Useful press structure in this respect is shown for example in U.S. Pat. No. 3,302,558 and particularly FIG. 6 thereof. In the schematic showing, base 22 supports a pair of spaced, parallel, upright structures 24 and 26 which in turn rotatably carry horizontal, vertically spaced shafts 28 and 30 of counter roll 32 and embossing die 34 respectively. Gear sections 36 and 38 of counter 32 and die 34 respectively are adapted to intermesh and preclude rotation of the die and counter at different relative surface speeds. However, the gear sections do not interfere with relative parting movement of the counter and die yet assure proper registration thereof upon return of the embossing components to operative relationship as illustrated in FIGS. 1 and 2.

As is evident from FIG. 2, the press chosen for illustration purposes only has a shiftable embossing die rotatably carried by vertically movable end blocks 40 on structures 24 and 26 respectively, with suitable hydraulically actuated mechanism 42 of conventional nature for vertically reciprocating the die 34 while maintaining the shaft 30 thereof essentially parallel to the shaft 28 of counter 32. The core 44 of counter 32 (see FIG. 1) is preferably fabricated of suitable metallic material such as steel carried by opposed shafts 28 which may either be bolted to or integral with the core.

The outer cylindrical surface of core 44 is relieved to present a cylindrical area 46 extending around the circumference of the counter and spaced inwardly from the opposed end bearing surfaces 48 at opposite ends of the cylinder. Area 46 is preferably machined to a depth of about 0.020 in. below the level of co-cylindrical surfaces 48 and as will be explained, the relieved area 46 is filled with specially reinforced synthetic resin material and then run against the modeled surface of die 34 to produce a reverse of the modeled design. Mechanism 42 serves to force the outer face of die 34 into operative engagement with the resin coated surface of core 44 and thus the paper stock or other sheet material to be processed is passed between die 34 and counter 32 with the design bearing or printed face toward the outer surface of die 34. The various adjustments on the press allow side to side registration of the die cylinder for gear alignment, front to back registration of the die cylinder relative to the counter, and vertical adjustment between the two cylinders.

In a typical application, the die cylinder may have an overall length of 50 to 60 inches (e.g., 57 inches) with a design bearing surface of 40 inches leaving opposed bearing sections 50 adapted to complementally engage the surfaces 48 of counter 32, and a finished diameter of 7.639 in., giving a 24-inch design repeat blank. The basic die cylinder may for example be constructed from 2-inch thick tubular steel with welded end plates and shafts 30 on each end, along with internally welded steel support plates as required. Following machining to provide the design-defining area, electroformed copper is deposited onto the face of the cylinder. This provides the medium into which the die design is photoengraved and then suitably etched for completion of the die cylinder. This electrodeposited surface can also be machined, redeposited with copper and finished to a 7.639-in. diameter for recycle and preparation of new designs. Following the completion of each design photo-engraving on the die cylinder, chrome plating is then deposited on the copper over at least the full 40-inch length of the design portion of the cylinder.

The core cylinder of counter 32 is constructed in a manner very similar to that of die 34 in that the wall thickness is also 2 inches and the overall length of this cylinder is approximately that of the die. The relieved area 46 machined in counter 32 is preferably sandblasted to provide a somewhat roughened face for bonding the resin material to the counter thus insuring against slippage of the resin relative to the counter core during extended use. This is particularly important during long runs of the same design. Referring to FIG. 3 of the drawings, it is to be seen that the hydraulic mechanism 42 is actuated to shift die cylinder 34 away from counter 32 whereupon a layer of synthetic resin material of a thickness of about 0.002 in. is applied to the cylindrical surface area 46 of core 44. The horizontal doctor blade 52 carried by support 54 on angle 56 extending across the front of the press 20 is adjusted to assure that the resin material is of uniform thickness throughout the circumference of the counter.

A number of different resins may be used for preparing the counter surface. Exemplary compositions are those generically known as radiation curable (usually UV) urethanes, acrylates, thiophenes, polyesters, and other similar type materials having an olefinic type bond. These resins may all be partially cured with a radiation source such as UV and then fully cured to a fused mass state where the individually applied layers are no longer readily discernible as separate entities. The preferred resins are either a polythene-polythiol acrylate and acrylate monomer combination along with an initiator, or an acrylate prepolymer combined with, for example, an acetophenone or benzophenone initiator. A suitable acrylate resin system is a product of Polychrome Corporation, Yonkers, New York sold under the trade designation of Uvimer Resin 1713-H. A typical formulation is Uvimer 1713-H (98%) and 2,2 diethoxyacetephenone (2%), having a viscosity range of ≅ 50,000–100,000 centipoises. Other useful formulas include:

| 1. | Polyene/polythiol photopolymer 3811A sold by W. R. Grace and Co. | (90%) |
| | hydroxypropyl acrylate | (10%) |
| 2. | Polyene/polythiol photopolymer 3811A sold by W. R. Grace and Co. | (87%) |
| | 1,6 hexanediol diacrylate | (13%) |
| 3. | Acrylate prepolymer Uvimer DV-53 sold by Polychrome Corporation | (76%) |
| | hydroxypropyl acrylate | (20%) |
| | Trigonal 14 (a photoinitiator sold by Noury Chemical Company, Burt, N.Y.) | (4%) |
| 4. | Polyene/polythiol photopolymer 6011-G sold by W.R. Grace and Co. and containing a radiation response initiator or curing agent (uncured viscosity ≅ 8000 – 11,000 cps.) | (100%) |

The principal characteristics necessary for the resin material comprise (1) ability to effect hardening of the resin formulation on the press in a relatively short period of time (e.g., no more than about 20 total minutes for all of the resin layers), (2) sufficient viscosity in an uncured state that the resin material does not undergo significant flow when applied to the counter prior to curing thereof with the source of radiation or other curing medium and (3) capable of being selectively partially and then finally fully cured with a UV source or the like whereby successively applied layers of the resin may be hardened into an essentially monolithic coating reinforced with glass fiber. In all instances, cure characteristics and the physical properties of the final resin counter are governed by the speed of rotation of the roll, the thickness of the overall coating, the amount of glass roving applied, the total cure time, and the intensity of the radiation.

It has been determined in this respect that the resin composition should have a viscosity when applied to the counter surface of at least about 6000 cps. and preferably at least about 25,000 centipoises. Best results obtain in the 50,000–250,000 centipoises range. The upper limit of viscosity is that at which the material is so thick that it is impractical to apply the same to the counter surface or preceeding resin layers. Certain formulations are useful in viscosity ranges up to about 1,000,000 centipoises. In the most preferred embodiment of this invention, as evidenced by the specific formulations referenced above, the polymeric material is curable by application of ultraviolet radiation thereto by virtue of the fact that this materially lessens the make-ready time and lends itself to simple processing techniques since it is only necessary to appropriately place an ultraviolet lamp on the press in disposition spanning uprights 24 and 26 as indicated in FIGS. 1, 2, 4, 7, 9, 11 and 13. In the instance shown, inverted reflector and support 58 for UV lamp 60 make up a source 62 of ultraviolet radiation which is directed against the top part of counter 32 as the latter is rotated about the axes of shafts 28.

Curing unit 62 preferably has a power supply, high voltage wiring from the power supply to the assembly, an irradiator such as UV lamp, and a blower and duct mounted at one end of the reflector assembly to exhaust hot air therefrom. The bulb 60 may for example be a medium pressure, high intensity mercury lamp capable of emitting 200 watts of power per lineal inch and designed for a three inch focal length of distance from the adjacent surface of counter 32. Although the amperage and voltage parameters of UV sources may vary, an exemplary unit as described hereinafter for illustrative purposes only has been found to be especially suitable.

After application of the initial resin layer 64 to counter 32 as depicted in FIG. 3, and following doctoring of the resin to produce a layer on the order of 0.002 in., the resin is subjected to a cure for approximately one second by operation of the UV source unit 62 at ½ power (11.7 amps. at 220 v.) while counter 32 is rotating at 70 rpm (see FIG. 4).

The next step of the operation is illustrated in FIG. 5 wherein it can be seen that fiber glass roving 66 made up of substantially continuous strands of glass fibers is spirally wound around counter 32 in overlying relationship to partially cured resin layer 64 throughout the length of area 46. Owens Corning Fiberglass roving type 30 (6–8 mils thick) has been found to be satisfactory with the spiral wind being effected while tension is maintained on the roving during rotation of cylindrical counter 32 and with the individual lays of the glass roving being spaced a slight distance apart which for example may be of the order of ¼ to ¾ of the width of the roving as pressed flat against layer 64. It is important that the roving be applied under sufficient pre-tensioning conditions to cause the same to lay flat and true on the underlying partially cured resin. It is to be understood that the distance between the roving lays may be varied as desired but it is preferred that some space therebetween be provided to permit resin to firmly bond to the underlying layer 64 in surrounding relationship to the glass fibers. Greater spacing than preferred may be used but somewhat at a sacrifice in the overall strength of the counter surface. The applied tensiion should not be so excessive as to cause the roving to completely penetrate the resin layer therebeneath and lay flat against the metal cylindrical supporting surface.

After completion of the roving application, another resin layer 68 (see FIG. 6) is applied to counter 32 over the roving and initial resin coating 64 and doctor blade 52 is adjusted to provide a second resin layer covering the fiberglass by approximately 0.003-in. thickness. This layer is cured for three to seven seconds (preferably three to five) at ½ power (11.7 amps. at 220 v.) while the counter continues to rotate at 70 rpm. (See FIG. 7)

A 0.004-in. layer 70 of resin is applied to counter 32 as shown in FIG. 8 by appropriate adjustment of doctor blade 52 and layer 70 is then cured by operation of UV source 62 as shown in FIG. 9 for 3 to 7 seconds (preferably 3 to 5) at ½ power (11.7 amps. at 220 v.) while rotating the counter cylinder at 70 rpm.

Another resin layer (not illustrated schematically in the drawings) of about 0.004 in. thick may be applied over layer 70 if desired and again cured within the time and power parameters specified with respect to FIGS. 6 to 9 inclusive.

The final layer 72 is then applied to counter 32 with the thickness thereof being sufficient to bring the same into substantially conforming relationship to the outer faces of bearer surfaces 48. Doctor blade 52 controls the thickness of the layer as illustrated in FIG. 10. Layer 72 is partially cured as depicted in FIG. 11 by subjection of the resin to ultraviolet radiation for a time period of about 30 seconds while operating lamp 60 at ½ power (11.7 amps. at 220 v.) during rotation of countner 32 at about 9 rpm. The level of radiation and the time of partial cure may be varied as necessary to harden the material without making the same completely nondeformable.

Next, the die 34 is shifted by hydraulically actuated mechanisms 42 into pressure engagement with counter 32 (approximately 300 pounds pressure) and wet resin applied to the face of counter 36 to provide an image layer 78 sufficient to fill the intaglio design 74 in the outer metal layer 76 of embossing or foil stamping die 34. The UV source 62 is again energized and the resin cured at full power for a time of approximately 1½ minutes while rotating cylinders 32 and 34 in contacting engagement at 9 rpm as shown in FIG. 13.

The resulting counter 32 has been found to have an exceptional life under continuous use and can be produced at a small fraction of the cost of prior counters, particularly those of the conventional paper or cotton pad type while at the same time being fully recyclable is that the resin coating may be readily removed and replaced in a relatively short period of time as required.

One particularly important feature of the invention is the fact that the completed counter has sufficient rigidity to withstand long continuous use but is not so brittle as to be subject to crazing or cracking. It is to be recognized in this respect that as paper or other sheet stock is passed between counter 32 and die 34, the resin is displaced slightly adjacent the nip in a direction opposite rotation of the rolls producing, on an exaggerated basis, a welling up or deflected standing wave the full length of the counter which would rapidly crack the material if it did not retain a certain degree of inherent resiliency. However, the glass roving spirally wound about the counter core imparts sufficient strength to the resin body to prevent the continuously moving raised area of the resin at the nip from cracking the material and causing rapid deterioration thereof. It is believed to be especially significant to long operable life that the roving be spirally wound about the cylinder under tension and in a continuous non-interrupted fashion for relatively uniform stress distribution throughout the circumference of the resin part of the counter thus giving unexpected counter longevity. Tests have shown that counters made in accordance with the preferred concepts of this invention have up to a tenfold life expectancy over those produced under U.S. Pat. No. 3,560,289.

Having thus described the invention, what is claimed as new and desired to be secured by Letters Patent is:

1. A rotary counter roller comprising:
    a cylindrical core;
    a continuous wrap of reinforcing roving material comprising individual lays of continuous glass fiber strands spirally wound in essentially one direction circumferentially about said core under tension and bonded to the core along the length of the latter; and
    at least one layer of hardened ultraviolet cured resin material over said pre-tensioned roving, the outer surface of said material being configured to conform to a die as the reverse thereof, said resin having a viscosity of at least about 6000 cps. prior to hardening thereof.

2. The counter roller as set forth in claim 1 including a primary layer of at least partially hardened synthetic resin material applied directly to said core, with said roving material wrapped around the primary layer bonded thereto.

3. The counter roller as set forth in claim 2 wherein the convolutions of said spiral wrap are spaced to an extent less than the diameter of the roving.

4. The counter roller as set forth in claim 3 including a plurality superposed, at least partially hardened secondary layers of synthetic resin material over said roving, with at least the innermost of said secondary layers being directly bonded to said primary layer through the spaces between said roving convolutions.

5. The counter roller as set forth in claim 1 wherein said synthetic resin material is initially flowable and is characterized by the property of being hardenable under the influence of ultraviolet energy.

6. The counter roller as set forth in claim 5 wherein said resin includes a member selected from the group consisting of radiation curable urethanes, acrylates and thiophenes.

7. The counter roller as set forth in claim 6 wherein said resin has a minimum viscosity of about 25,000 centipoises prior to hardening thereof.

8. The counter roller as set forth in claim 1 wherein said cylinder core is provided with a central, circumferentially extending relieved area defining cylindrical bearer surfaces at opposite ends thereof, said resin and roving material filling only the area of said core.

* * * * *